United States Patent
Jehan et al.

(10) Patent No.: US 10,089,578 B2
(45) Date of Patent: Oct. 2, 2018

(54) AUTOMATIC PREDICTION OF ACOUSTIC ATTRIBUTES FROM AN AUDIO SIGNAL

(71) Applicant: SPOTIFY AB, Stockholm (SE)

(72) Inventors: Tristan Jehan, Brooklyn, NY (US); Nicola Montecchio, Brooklyn, NY (US)

(73) Assignee: Spotify AB, Stockholm (SE)

( * ) Notice: Subject to any disclaimer, the term of this patent is extended or adjusted under 35 U.S.C. 154(b) by 0 days.

(21) Appl. No.: 15/331,136

(22) Filed: Oct. 21, 2016

(65) Prior Publication Data

US 2017/0116533 A1 Apr. 27, 2017

Related U.S. Application Data

(60) Provisional application No. 62/245,848, filed on Oct. 23, 2015.

(51) Int. Cl.
| | |
|---|---|
| *G06F 15/18* | (2006.01) |
| *G06N 5/04* | (2006.01) |
| *G06N 99/00* | (2010.01) |
| *G06F 17/30* | (2006.01) |

(52) U.S. Cl.
CPC ......... *G06N 5/04* (2013.01); *G06F 17/30743* (2013.01); *G06N 99/005* (2013.01); *G10H 2240/081* (2013.01); *G10H 2240/085* (2013.01); *G10H 2240/145* (2013.01)

(58) Field of Classification Search
CPC ..... G06N 7/005; G06N 3/08; G06F 17/30787
USPC .............................................. 706/12, 15, 45
See application file for complete search history.

(56) References Cited

U.S. PATENT DOCUMENTS

| | | | |
|---|---|---|---|
| 7,260,568 B2 | 8/2007 | Zhang et al. | |
| 7,842,874 B2 | 11/2010 | Jehan | |
| 7,949,649 B2 | 5/2011 | Whitman | |
| 8,073,854 B2 | 12/2011 | Whitman et al. | |
| 8,280,539 B2 | 10/2012 | Jehan | |
| 8,280,889 B2 | 10/2012 | Whitman | |
| 8,492,633 B2 | 7/2013 | Whitman et al. | |
| 8,586,847 B2 | 11/2013 | Ellis et al. | |
| 9,235,853 B2* | 1/2016 | Weston | G06Q 30/0282 |
| 2003/0033347 A1* | 2/2003 | Bolle | G06F 17/30253 718/107 |
| 2004/0205482 A1* | 10/2004 | Basu | G06F 17/241 715/201 |
| 2009/0030862 A1* | 1/2009 | King | G06F 17/30705 706/45 |
| 2010/0205222 A1* | 8/2010 | Gajdos | G06F 17/30743 707/803 |

(Continued)

OTHER PUBLICATIONS

Jehan, et al., "Analyzer Documentation", The Echo Nest Corp.; Analyzer Version: 3.2; pp. 1-6, Jan. 7, 2014.

(Continued)

*Primary Examiner* — David R Vincent
(74) *Attorney, Agent, or Firm* — Merchant & Gould P.C.

(57) ABSTRACT

A system, method and computer product for predicting a content attribute are provided by collecting labeled media objects labeled with one or more attributes, constructing a feature vector of content-derived values for each of the labeled media objects, generating a model based on the feature vector and the one or more attributes, and applying the model to one or more unlabeled media objects to generate one or more attribute labels.

29 Claims, 4 Drawing Sheets

(56) References Cited

U.S. PATENT DOCUMENTS

| | | | |
|---|---|---|---|
| 2011/0295843 A1 | 12/2011 | Ingrassia, Jr. et al. | |
| 2013/0204885 A1 | 8/2013 | Clinchant et al. | |
| 2015/0019463 A1* | 1/2015 | Simard | G06F 17/2785 |
| | | | 706/12 |
| 2016/0004911 A1* | 1/2016 | Cheng | G11B 27/10 |
| | | | 382/159 |
| 2016/0071024 A1* | 3/2016 | Amer | G06N 99/005 |
| | | | 706/12 |
| 2016/0284346 A1* | 9/2016 | Visser | G10L 15/16 |

OTHER PUBLICATIONS

Nieto, et al., "Convex Non-Negative Matrix Factorization for Automatic Music Structure Identification", Acoustics, Speech and Signal Processing (ICASSP), 2013 IEEE Int'l Conf., Vancouver, BC, May 26-31, 2013, pp. 236-240.

Bartsch, et al., "Audio Thumbnailing of Popular Music using Chroma-Based Representations", IEEE Transactions on Multimedia, vol. 7, No. 1; pp. 96-104, (Feb. 2005).

Jehan, T., "Downbeat Prediction by Listening and Learning", Oct. 16-19, 2005, IEEE Workshop on Applications of Signal Processing to Audio and Acoustics, New Paltz, NY.

Jehan, T., "Perceptual Synthesis Engine: An Audio-Driven Timbre Generator", Sep. 2001, Massachusetts Institute of Technology, Cambridge, MA.

Jehan, T., "Event-Synchronous Music Analysis/Synthesis", Oct. 5-8, 2004, Proceedings of the 7th International Conference on Digital Audio Effects (DAFx'04), Naples, Italy.

Jehan, T., "Perceptual Segment Clustering for Music Description and Time-Axis Redundancy Cancellation", 2004, Massachusetts Institute of Technology Media Laboratory, Cambridge, MA.

Jehan, T., "Hierarchical Multi-Class Self Similarities", Oct. 16-19, 2005, IEEE Workshop on Applications of Signal Processing to Audio and Acoustics, New Paltz, NY.

Turnbull, et al., "Modeling Music and Words Using a Multi-Class Naïve Bayes Approach", Retrieved from the Internet: URL:http://citeseerx,ist.psu.edu/viewdoc/download?doi=10.1.1.295.5420&rep=rep1&type=pdf; Dec. 31, 2006.

Masataka, et al., "Recent Studies on Music Information Processing", National Institute of Advanced Industrial Science and Technology (AIST), Retrieved from the Internet: URL:http://ci.nii.ac.jp/lognavi?name=nels&lang=en&type=pdf&id+ART0003505023; Dec. 31, 2004.

Int'l Search Report and The Written Opinion issued in connection with Int'l Appln. No. PCT/US2016/058040 dated Feb. 22, 2017.

* cited by examiner

AUTOMATIC PREDICTION OF ACOUSTIC ATTRIBUTES FROM AN AUDIO SIGNAL

CROSS REFERENCE TO RELATED APPLICATION

This application claims priority to U.S. Provisional Application No. 62/245,848 filed Oct. 23, 2015, the contents of which are incorporated herein by reference.

BACKGROUND OF THE INVENTION

Field of the Invention

Example aspects described herein relate generally to acoustic analysis, and more particularly to systems, methods and computer products for predicting acoustic attributes.

Description of Related Art

While music is composed of objective properties (e.g., tempo, onsets, durations, pitches, instruments), its audio recording carries inherent information that induces emotional responses from humans, which are typically problematic to quantify. Subjective and lacking a base unit, like "seconds" for duration, or "hertz" for pitch, these responses may nevertheless be fairly consistent across the spectrum of listeners, and therefore can be considered intrinsic song attributes. Subjective attributes include for instance the measure of intensity or energy of a song, the valence or musical positiveness conveyed by the song, and the suitability of a song for a particular activity (e.g., dancing).

Other song attributes, however, are reasonably objective but hardly detectable from the structure of the music, its score representation or its transcription. These include, for example, whether a song: was recorded live; was exclusively recorded with acoustic instruments; is exclusively instrumental; and the vocals are spoken words.

One technical challenge involving audio processing systems relates to modeling and prediction of acoustic attributes from an audio signal.

BRIEF DESCRIPTION

The example embodiments described herein provide methods, systems and computer products for predicting a content attribute by collecting one or more labeled media objects (e.g., song recordings), wherein the labeled media objects are labeled with one or more attributes; constructing a feature vector of one or more content-derived values for each of the labeled media objects, and generating a model based on the feature vector and the attributes.

In one example aspect the model is applied to the unlabeled media objects to generate one or more attribute labels. In another example aspect, the labeled media objects are labeled based on a user input.

The labeled media objects can also be labeled based on a title of the labeled media objects or on a text description of the labeled media objects.

In another example aspect, the attributes are a classification of the media objects into one or more classes.

In yet another example aspect, at least one of the attributes is a ranking of the labeled media objects.

In one example aspect, at least one of the content-derived values is normalized and scaled according to a distribution of the content-derived values in the labeled media objects.

In yet another example aspect, the step of constructing the feature vector further includes steps of sampling a segment of the labeled media objects; identifying one or more local content features in the segment; clustering the local content features into one or more clusters; normalizing and scaling the clusters according to a distribution in the labeled media objects; and concatenating the clusters into the feature vector.

In one example aspect, the model is calculated using a supervised learning model.

The supervised learning model can be based on, for example, any one of (i) a logistic regression, (ii) support vector machines (SVM, or (iii) artificial neural networks (AAN).

The step of applying the model to the unlabeled media objects can further include steps of estimating a predicted attribute of the one or more unlabeled media objects; and refining the predicted attribute using a probabilistic graphical model, where the probabilistic graphical model is a Bayesian network.

The above-described functionality can also be performed in a platform constructed to automatically label media content based on user activity.

BRIEF DESCRIPTION OF THE DRAWINGS

The features and advantages of the example embodiments of the invention presented herein will become more apparent from the detailed description set forth below when taken in conjunction with the following drawings.

DESCRIPTION

The example embodiments of the invention presented herein are directed to methods, systems and computer program products for providing automatic prediction of acoustic attributes from an audio signal. Generally, example aspects provide a framework that models and predicts acoustic attributes (objective or subjective) from an audio signal using a supervised learning approach.

Figure 1:
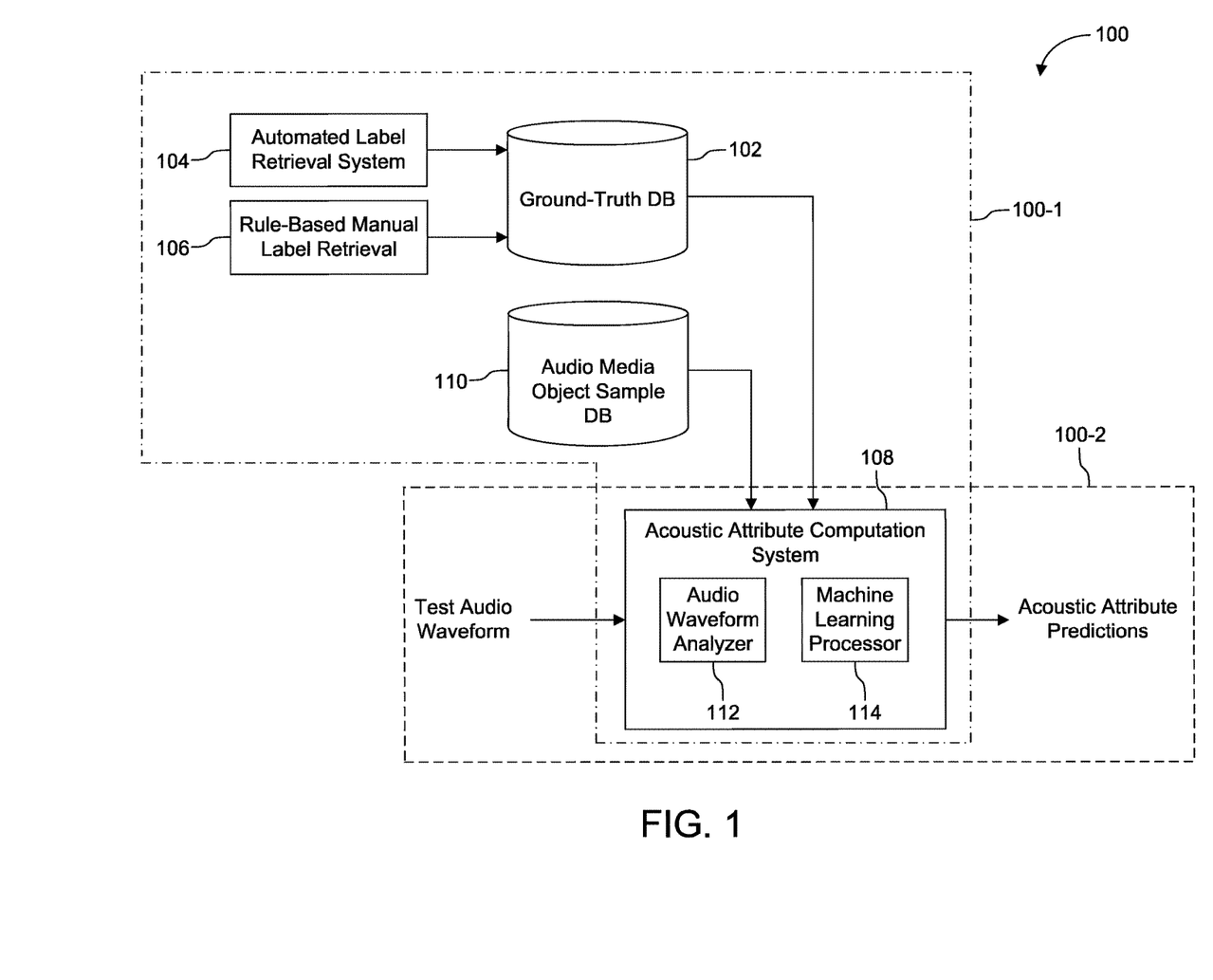
FIG. 1 illustrates a system for generating acoustic attribute predictions according to an example embodiment.

FIG. 1 illustrates a system 100 for generating acoustic attribute predictions according to an example embodiment. System 100 is shown as two subsystems, a training subsystem 100-1 that performs training and an acoustic attribution prediction subsystem 100-2 that predicts acoustic attributes of a test audio waveform.

As shown in FIG. 1, system 100 includes a ground-truth database 102 that is populated with a ground truth dataset (also referred to as "labeled training data" or "training examples"). The ground truth dataset is provided through the use of an automated label retrieval system 104, a rule-based manual label retrieval system 106, or a combination of both. Audio waveform analyzer 112 generates audio feature vectors.

Generally, learning subsystem 100-1 collects labeled media objects labeled with attributes, constructs a feature vector of one or more content-derived values for each of the labeled media objects, and then generates a model based on the feature vector and the attributes (also referred to as "ground truths"). In turn, an acoustic attribution prediction subsystem 100-2 applies the model to unlabeled media objects to generate attribute labels.

In the learning stage, learning subsystem 100-1 generates audio feature vectors by processing audio waveforms from media objects (e.g., audio recordings or samples of audio recordings) using an audio waveform analyzer 112. For illustrative purposes, the media objects are shown as having been pre-stored in audio media object sample database 110. An acoustic attribute computation system 108 is fed the ground-truth dataset from ground-truth database 102 and uses a machine learning processor 114 to learn from the ground-truth data and the audio feature vectors generated by audio waveform analyzer 112.

The above-described learning process enables acoustic attribute computation system 108 to make acoustic attribute predictions from a test audio waveform. That is, once the training subsystem 100-1 has trained the acoustic attribute computation system 108, a test audio waveform can be fed to the acoustic attribution prediction subsystem 100-2 to make acoustic attribute predictions.

The ground-truth dataset stored in ground-truth database 102 is generated as follows. One or more labeled media objects (e.g., song recordings and/or samples) are collected, where the labeled media objects are each labeled with one or more attributes (i.e., ground-truths). The features (e.g., audio features) of each media object are correlated to ground-truth labels that define what a model (i.e., a learning algorithm) may learn from (i.e. describe and generalize).

In one example embodiment, the ground-truth dataset covers a predetermined range of songs (e.g., predetermined styles, genres, and variations) to be considered for a given attribute. An attribute can be described on a continuous scale (e.g. energy) or intrinsically fall into a binary-classification type (e.g. live recording vs. studio recording).

Labels can be retrieved from pre-labelled audio media objects through automated means (e.g., automated label retrieval system 104 of FIG. 1). This can be accomplished, for example, by retrieving labels from a pre-labelled media object and analyzing them to determine how they describe the characteristics of the media object. In such an approach, an assumption can be made that the media objects for which a term appears in their title have a higher probability of actually corresponding to the characteristic (e.g., styles, genres, variations, etc.) associated with that term. For example, media objects for which the term "live" appears in their title have a higher probability of actually being live recordings. Another automated mechanism for retrieving pre-labelled media objects is querying media objects via descriptors such as "sad" or "speech" on crowdsourced online music datasets such as SOUNDCLOUD, LAST.FM, and the like.

Optionally, a manual validation of the results obtained from the above-described automated processes can be performed.

A rule-based, manual label retrieval method can be performed as well (Rule-Based Manual Label Retrieval 106 of FIG. 1). More specifically, randomized, judiciously picked or automatically selected media objects can be collected and processed according to the following example strategies:

Bucketing: by collecting songs or short samples of media objects (i.e., song recordings) into a set of two or more distinct classes. For example, in the context of modeling "speechiness" (i.e., whether a track is made up of speech or music), random tracks are labeled in three ways: (1) whether the track is speech, (2) whether it is music, or (3) a combination of both.

Pairing: by comparing two or more media objects and ranking them along a considered scale. For example, in the context of modeling "valence" (i.e. how positive a song sounds), a set of small groups of, e.g., three to five songs are ranked from negative to positive. Pairs can automatically be inferred from these short and manageable ranking tasks.

Once the label dataset has been collected and stored in ground-truth label database 102, acoustic attribute computation system 108 (FIG. 1) uses machine learning to enable acoustic attribute computation system 108 to adaptively improve its performance with experience accumulated from the observed data. In one example embodiment, a supervised learning approach is used, where the machine learning task of inferring a function is performed from labeled training data, i.e. training examples. The supervised learning process uses training examples including pairs consisting of input features (i.e., a feature vector of audio-derived values or simply "feature vectors") derived from audio waveform analyzer 112 and the labels collected automatically or provided by listeners through data collection as described above. A pair can characterize a song or characterize a smaller sample of audio.

Figure 2:
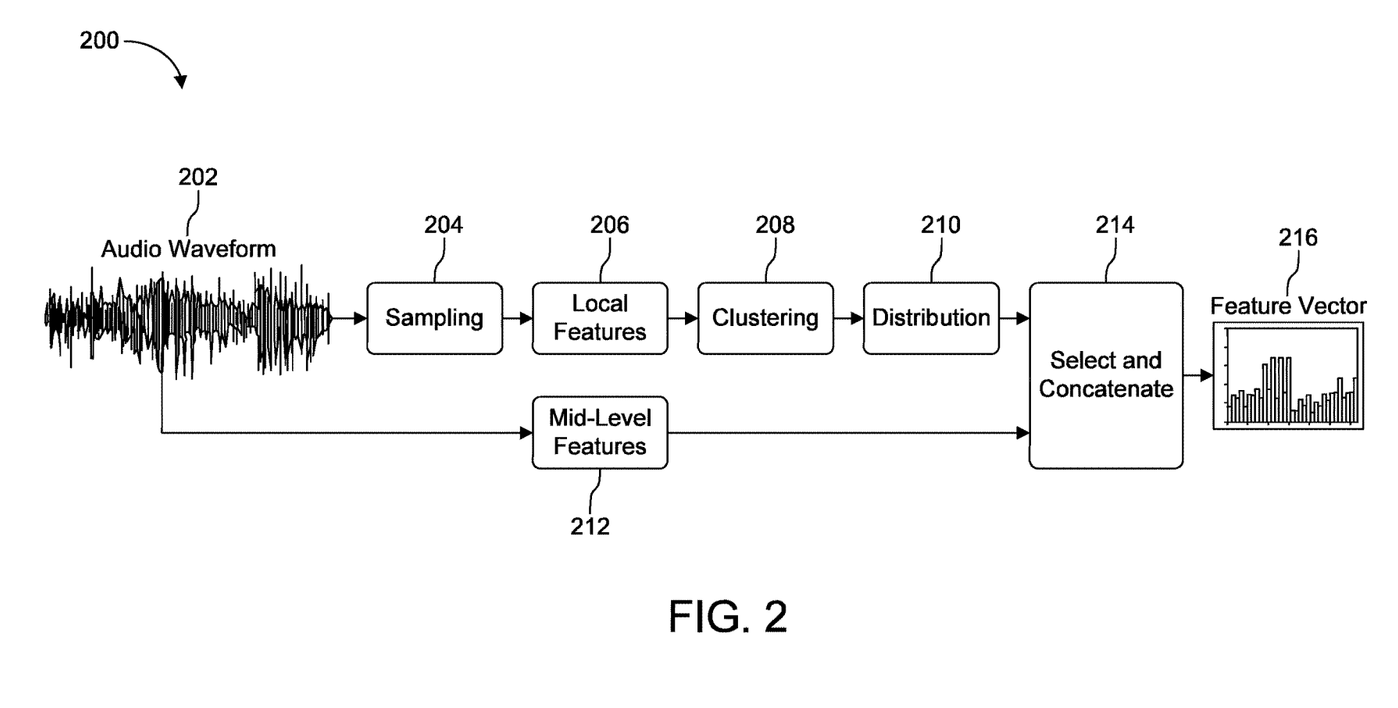
FIG. 2 is a block diagram of a system for representing an audio media object into a vector of audio features according to an example embodiment.

FIG. 2 is a schematic illustrating a method for representing a media object into a vector of audio features. As shown in FIG. 2, a model of the audio features of a sample audio waveform 202 is generated by sampling (block 204) (e.g., by an audio sampler) the audio waveform 202, extracting its local features 206 (e.g., by an audio extraction unit), clustering the local features 208 (by a clustering unit), performing a distribution function on the clustered local features 210 and summarizing mid-level features obtained from the audio waveform 202 and distribution features.

Relevant audio features depend on the acoustic attribute being modeled. For instance, pitch-based features better apply to the modeling of "valence" than of "energy" or "liveness". Timbral features better apply to the modeling of "acousticness" (i.e. whether the song is acoustic or electric) than of "valence". The proper design and selection of features helps simplify the subsequent learning task. Automatic feature-selection and data-reduction algorithms can be used to reduce the complexity and computation as well as data noise.

In an example embodiment, mid-level features that summarize an entire media object into single numbers are designed, such as the mean or standard deviation of the dynamic-range of all sound segments, the tempo stability, the beat strength, or a measure of harmonicity. Mid-level features can be retrieved from a media object by, for example, generating a text file (e.g. JSON-formatted text file) that describes the structure and content based on this design. These mid-level features can be normalized and scaled according to their overall distribution in order to cope with heterogeneous ranges.

In one example embodiment, small chunks of audio (samples) can be classified over time. In turn, a histogram (distribution) of these classes is constructed to characterize the entire media object (block 210 of FIG. 2). Inputs to the classifier (e.g., using k-means, spectral hashing, ANN (artificial neural networks), SVM (support vector machine)) may include any locally meaningful features. The number of classes can be small enough to generalize the distribution but large enough to represent significant class variations. The mid-level features and the distribution features are, in turn, selected and concatenated 214 to form a feature vector 216. The final feature vector 216 may include mid-level features 212 generated by a mid-level feature extraction engine (described below), distribution features 210 generated by a distribution feature extraction engine (described below), or a combination of both.

Once enough pairs of labels and feature vectors have been collected, the data is ready for training, i.e. learning the function that describes and generalizes the projection from feature vector to label. Depending on the algorithm (e.g. logistic regression, SVM, ANN, LDA (linear discriminant analysis, and the like), adjustments can be made to one or more parameters via optimization (e.g., gradient descent, randomized hill climbing and the like) on a validation set. A cross validation insures global and smooth tuning given a training set.

Overall performance can be measured on a test set, separate from the training set. Generally, outputs are normalized and scaled to a range of 0-1 for convenience. If the target outcome is ranking, the sorted list can be evaluated against the ground-truth pairs of the test set via, for example, a non-parametric measure such as the Kendall's Tau coefficient, defined as equation (1) below:

$$\tau = \frac{\text{(number of concordant pairs)} - \text{(number of discordant pairs)}}{\frac{1}{2}n(n-1)} \quad (1)$$

Kendall's Tau is a non-parametric measure of relationships between columns of ranked data. The Tau correlation coefficient returns a value of 0 to 1, where: 0 is no relationship, and 1 is a perfect relationship.

If the target outcome is a binary classification, the percentage of correctly classified songs is evaluated given a 50/50 split. An F1-measure can be applied, for example, which is defined as equation (2) below:

$$F_1 = 2 \cdot \frac{\text{precision} \cdot \text{recall}}{\text{precision} + \text{recall}} \quad (2)$$

$$\text{precision} = \frac{tp}{tp + fp}$$

$$\text{recall} = \frac{tp}{tp + fn}$$

where tp are true positives, fp are false positives, and fn are false negatives.

In the case where the accuracy at the extreme ends of the classification range is considered, quality is evaluated by considering songs above a certain margin around either side of the classifier boundary (e.g., below 0.33 and above 0.66).

A qualitative evaluation of the results through listening of a representative sample of misclassified songs may reveal musical coverage issues (e.g. a particular style or genre not very well classified). In this case the entire learning process can be reiterated by first collecting and labeling more media objects in the misclassified style. Eventually accuracy may reach a plateau for the type of audio features, quality of labels, and performance of the learning algorithm, in which case the function generalizes sufficiently to predict at scale the attributes of new songs at the expected quality.

Another step following the prediction of attributes from the audio signal may include the consideration of additional prior knowledge signals like the song genre or style. This refinement step can be modeled statistically through probabilistic graphical models (e.g., Bayesian networks).

One assumption is that, in the context of a binary attribute, a genre is often biased towards one side of the attribute, e.g. songs that are associated with the genre "classical" are mostly acoustic, while the opposite situation applies to "metal". The information provided by the genre of a song can be used to identify probable classification errors and "correct" them.

In an example embodiment, the model is trained using a Montecarlo approach (Gibbs sampling).

Figure 3:
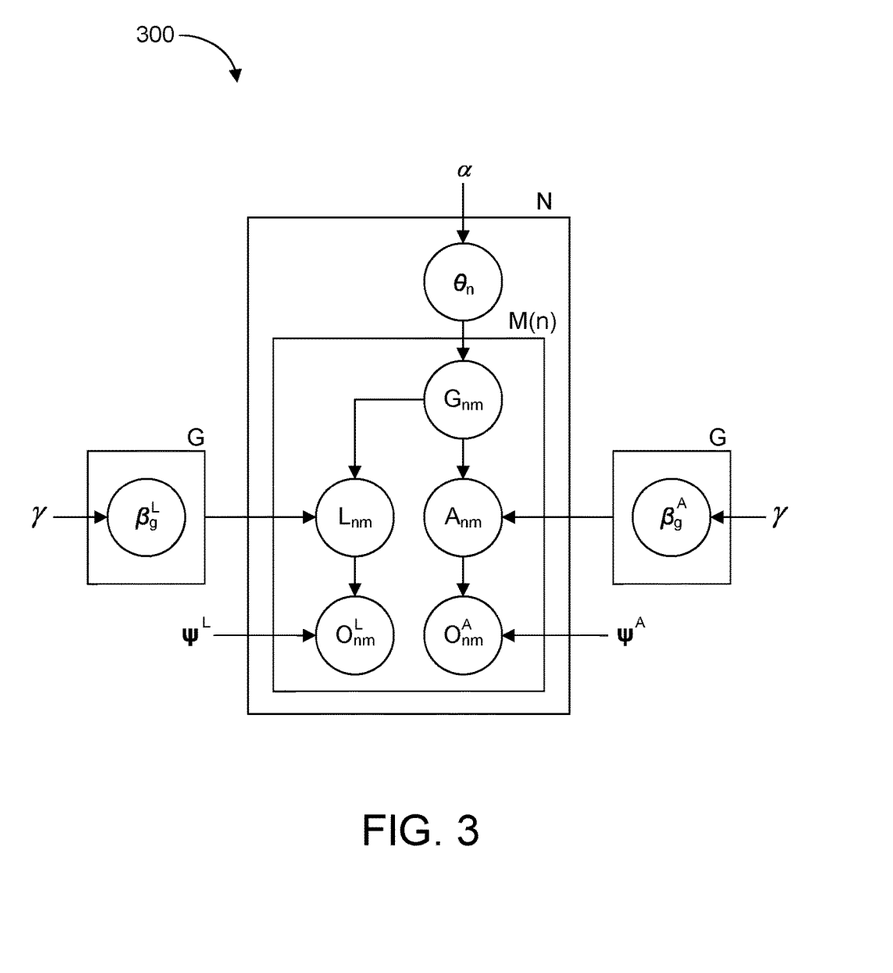
FIG. 3 illustrates a probabilistic graphical model for estimating liveness and acousticness for a collection of artists according to an example embodiment.

FIG. 3 illustrates a probabilistic graphical model, executed by acoustic attribute computation system 108 (FIG. 1), for estimating liveness (L) and acousticness (A) for a collection of N artists associated with M(n) songs, given the attributes computed from the audio signal ($O^L$, $O^A$), and a distribution θ over G genres for the artist, according to an example embodiment. The β variables control the genre biases.

More specifically, the probabilistic graphical model shown in FIG. 3 causes a processor to perform the fusion of different data sources in order to attain increased accuracy. The data sources (e.g., the multiple values obtained through acoustic modeling and any eventual genre information) are not independent of each other. Instead, the statistical properties of their distributions are used to train the model itself.

Below is a list of example acoustic attributes. Each is given as a single floating point number ranging from 0.0 to 1.0 and is available for every song that has been indexed.

Danceability: describes how suitable a track is for dancing using a number of musical elements (the more suitable for dancing, the closer to 1.0 the value). The combination of musical elements that best characterize danceability include tempo, rhythm stability, beat strength, and overall regularity.

Energy: represents a perceptual measure of intensity and powerful activity released throughout the track. Typical energetic tracks feel fast, loud, and noisy. For example, death metal has high energy, while a Bach prelude scores low on the scale. Perceptual features contributing to this attribute include dynamic range, perceived loudness, timbre, onset rate, and general entropy.

Speechiness: detects the presence of spoken words in a track. The more exclusively speech-like the recording (e.g. talk show, audio book, poetry), the closer to 1.0 the attribute value. Values above 0.66 describe tracks that are probably made entirely of spoken words. Values between 0.33 and 0.66 describe tracks that may contain both music and speech, either in sections or layered, including such cases as rap music. Values below 0.33 most likely represent music and other nonspeech-like tracks.

Liveness: detects the presence of an audience in the recording. The more confident that the track is live, the closer to 1.0 the attribute value. In an example embodiment, the threshold for detecting liveness is higher than for speechiness. A value above 0.8 provides strong likelihood that the track is live. Values between 0.6 and 0.8 describe tracks that may or may not be live or contain simulated audience sounds at the beginning or end. In an example embodiment, values below 0.6 represent studio recordings.

Acousticness: represents the likelihood a recording was created by solely acoustic means such as voice and acoustic instruments as opposed to electronically such as with synthesized, amplified, or effected instruments. Tracks with low acousticness include electric guitars, distortion, synthesizers, auto-tuned vocals, and drum machines, whereas songs with orchestral instruments, acoustic guitars, unaltered voice, and natural drum kits will have acousticness values closer to 1.0.

Valence: describes the musical positiveness conveyed by a track. Tracks with high valence sound more positive (e.g., happy, cheerful, euphoric), while tracks with low valence sound more negative (e.g. sad, depressed, angry). This attribute in combination with energy is a strong indicator of acoustic mood, the general emotional qualities that may characterize the acoustics of the track. Note that in the case of vocal music, lyrics may differ semantically from the perceived acoustic mood.

Instrumentalness: represents the likelihood a recording contains only instruments and absolutely no vocal track. Songs featuring the human voice, more particularly lyrics, even with instruments, will score low on the attribute scale. Songs with only instruments will score high on the scale.

Applications for the prediction of acoustic attributes include song search, classification, similarity, playlisting, and recommendation.

For example, an application programming interface (API) can be used to search a catalog through a set of value-range constraints including acoustic attributes such as danceability, energy, or valence. Songs can also be classified by their type (e.g., live, studio, speech or music), enabling the ability for automated systems to automatically categorize catalogs into subclasses.

The results from the above mechanisms can also be incorporated into music analysis systems that determine the similarity of media objects (e.g., songs) which can be used to generate, for example, smart playlists, recommendations, and the like.

Figure 4:
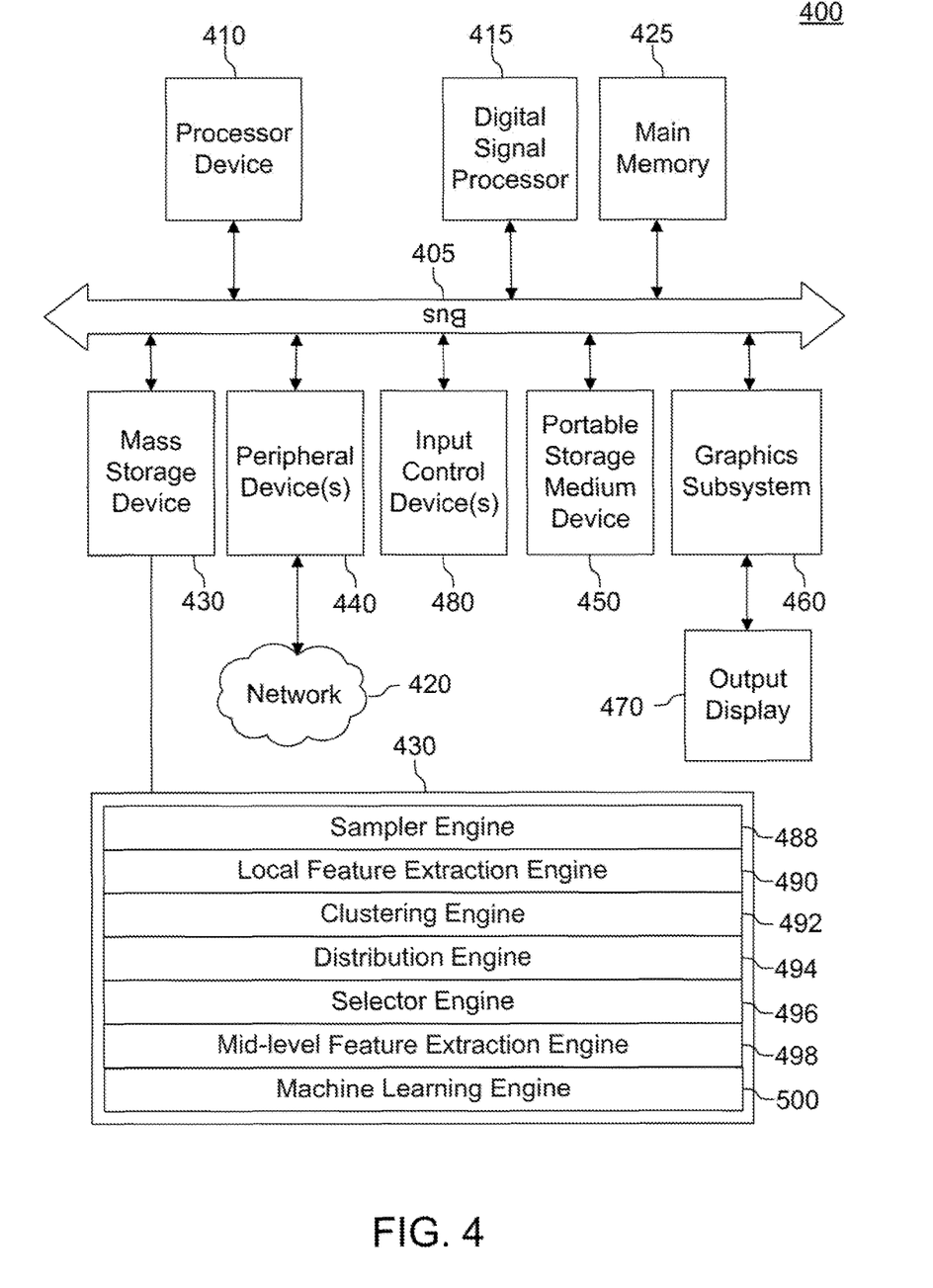
FIG. 4 is a block diagram showing an example acoustic attribute computation system constructed to realize the acoustic attribute prediction functionality of the example embodiments described herein.

FIG. 4 is a block diagram showing an example acoustic attribute computation system 400 constructed to realize the acoustic attribute prediction functionality of the example embodiments described herein.

Acoustic attribute computation system 400 may include without limitation a processor device 410, a main memory 425, and an interconnect bus 405. The processor device 410 may include without limitation a single microprocessor, or may include a plurality of microprocessors for configuring the system 400 as a multi-processor acoustic attribute computation system. The main memory 425 stores, among other things, instructions and/or data for execution by the processor device 410. The main memory 425 may include banks of dynamic random access memory (DRAM), as well as cache memory.

The system 400 may further include a mass storage device 430, peripheral device(s) 440, portable non-transitory storage medium device(s) 450, input control device(s) 480, a graphics subsystem 460, and/or an output display interface 470. A digital signal processor (DSP) 415 may also be included to perform audio signal processing described above in connection with FIG. 2. For explanatory purposes, all components in the system 400 are shown in FIG. 4 as being coupled via the bus 405. However, the system 400 is not so limited. Elements of the system 400 may be coupled via one or more data transport means. For example, the processor device 410, the digital signal processor 415 and/or the main memory 425 may be coupled via a local microprocessor bus. The mass storage device 430, peripheral device(s) 440, portable storage medium device(s) 450, and/or graphics subsystem 460 may be coupled via one or more input/output (I/O) buses. The mass storage device 430 may be a nonvolatile storage device for storing data and/or instructions for use by the processor device 410. The mass storage device 430 may be implemented, for example, with a magnetic disk drive or an optical disk drive. In a software embodiment, the mass storage device 430 is configured for loading contents of the mass storage device 430 into the main memory 425.

Mass storage device 430 additionally stores a sampler engine 488 for sampling the audio waveform, a local feature extraction engine 490 for extracting the local features, a clustering engine 492 for clustering the local features, a distribution engine 494 for performing distribution methods on the clustered local features, a selector engine 496, a mid-level feature extraction engine 498 for obtaining mid-level features from the audio waveform, and a machine learning engine 500 for learning from training data and analyzing a new audio waveform, as discussed above in connection with FIGS. 1-3.

The portable storage medium device 450 operates in conjunction with a nonvolatile portable storage medium, such as, for example, a solid state drive (SSD), to input and output data and code to and from the system 400. In some embodiments, the software for storing information may be stored on a portable storage medium, and may be inputted into the system 400 via the portable storage medium device 450. The peripheral device(s) 440 may include any type of computer support device, such as, for example, an input/output (I/O) interface configured to add additional functionality to the system 400. For example, the peripheral device(s) 440 may include a network interface card for interfacing the system 400 with a network 420.

The input control device(s) 480 provide a portion of the user interface for a user of the computer 400. The input control device(s) 480 may include a keypad and/or a cursor control device. The keypad may be configured for inputting alphanumeric characters and/or other key information. The cursor control device may include, for example, a handheld controller or mouse, a trackball, a stylus, and/or cursor direction keys. In order to display textual and graphical information, the system 400 may include the graphics subsystem 460 and the output display 470. The output display 470 may include a display such as a CSTN (Color Super Twisted Nematic), TFT (Thin Film Transistor), TFD (Thin Film Diode), OLED (Organic Light-Emitting Diode), AMO-LED display (Activematrix Organic Light-emitting Diode), and/or liquid crystal display (LCD)-type displays. The displays can also be touchscreen displays, such as capacitive and resistive-type touchscreen displays.

The graphics subsystem 460 receives textual and graphical information, and processes the information for output to the output display 470.

Input control devices 480 can control the operation and various functions of system 400.

Input control devices 480 can include any components, circuitry, or logic operative to drive the functionality of system 400. For example, input control device(s) 480 can include one or more processors acting under the control of an application.

Each component of system 400 may represent a broad category of a computer component of a general and/or special purpose computer. Components of the system 400 are not limited to the specific implementations provided herein.

Software embodiments of the examples presented herein may be provided as a computer program product, or software, that may include an article of manufacture on a machine-accessible or machine-readable medium having instructions. The instructions on the non-transitory machine-accessible machine-readable or computer-readable medium may be used to program a computer system or other electronic device. The machine- or computer-readable medium may include, but is not limited to, floppy diskettes, optical disks, and magneto-optical disks or other types of media/machine-readable medium suitable for storing or transmitting electronic instructions. The techniques described herein are not limited to any particular software configuration. They may find applicability in any computing or processing environment. The terms "computer-readable", "machine-accessible medium" or "machine-readable medium" used herein shall include any medium that is capable of storing, encoding, or transmitting a sequence of instructions for execution by the machine and that causes the machine to perform any one of the methods described herein. Furthermore, it is common in the art to speak of software, in one form or another (e.g., program, procedure, process, application, module, unit, logic, and so on), as taking an action or causing a result. Such expressions are merely a shorthand way of stating that the execution of the software by a processing system causes the processor to perform an action to produce a result.

Some embodiments may also be implemented by the preparation of application-specific integrated circuits, field-programmable gate arrays, or by interconnecting an appropriate network of conventional component circuits.

Some embodiments include a computer program product. The computer program product may be a storage medium or media having instructions stored thereon or therein which can be used to control, or cause, a computer to perform any of the procedures of the example embodiments of the invention. The storage medium may include without limitation an optical disc, a ROM, a RAM, an EPROM, an EEPROM, a DRAM, a VRAM, a flash memory, a flash card, a magnetic card, an optical card, nanosystems, a molecular memory integrated circuit, a RAID, remote data storage/archive/warehousing, and/or any other type of device suitable for storing instructions and/or data.

Stored on any one of the computer-readable medium or media, some implementations include software for controlling both the hardware of the system and for enabling the system or microprocessor to interact with a human user or other mechanism utilizing the results of the example embodiments of the invention. Such software may include without limitation device drivers, operating systems, and user applications. Ultimately, such computer-readable media further include software for performing example aspects of the invention, as described above.

Included in the programming and/or software of the system are software modules for implementing the procedures described above.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-4 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method of predicting a content attribute, comprising the steps of:
   collecting, via an input interface, one or more labeled media objects including audio content, wherein the one or more labeled media objects are labeled with one or more training attributes, the training attributes including at least one of danceability, energy, speechiness, liveness, acousticness, valence, and instrumentalness;
   storing, in a ground-truth database, the one or more training attributes;
   extracting, by a local feature extraction engine, one or more local features associated with the audio content;
   retrieving from the one or more labeled media objects, by a mid-level feature extraction engine, one or more mid-level features associated with the audio content;
   constructing, by a selector engine, a feature vector of one or more content-derived values for each of the one or more labeled media objects based on (i) the one or more local features, (ii) the one or more mid-level features, or (iii) a combination of (i) and (ii);
   generating, using a machine learning processor, a model based on the feature vector and the one or more attributes;
   receiving, via the interface, one or more unlabeled media objects including audio content; and
   applying the model to the one or more unlabeled media objects to generate one or more predicted acoustic attribute labels corresponding to the audio content of the unlabeled media objects, the predicted acoustic attribute labels including at least one of danceability, energy, speechiness, liveness, acousticness, valence, and instrumentalness; and
   providing the one or more predicted acoustic attribute labels to a processor device to generate and output to a peripheral device at least one of (i) a playlist, (ii) a recommendation, (iii) a catalog search result, and (iv) one or more catalogs categorized into one of a plurality of subclasses.

2. The method according to claim 1, wherein the one or more labeled media objects are labeled based on a user input.

3. The method according to claim 1, wherein the one or more labeled media objects are labeled based on a title of the one or more labeled media objects.

4. The method according to claim 1, wherein the one or more labeled media objects are labeled based on a text description of the one or more labeled media objects.

5. The method according to claim 1, wherein the one or more training attributes are a classification of the one or more media objects into one or more classes.

6. The method according to claim 1, wherein at least one of the one or more training attributes is a ranking of the one or more labeled media objects.

7. The method according to claim 1, further comprising the steps of:
   normalizing and scaling at least one of the mid-level features according to a distribution of the one or more mid-level features in the one or more labeled media objects.

8. The method according to claim 1, wherein the step of constructing the feature vector further comprises steps of:

sampling a segment of the one or more labeled media objects;

identifying one or more local content features in the segment;

clustering the one or more local content features into one or more clusters;

normalizing and scaling the one or more clusters according to a distribution in the one or more labeled media objects; and concatenating the one or more clusters into the feature vector.

9. The method according to claim 1, wherein the model is calculated using a supervised learning model.

10. The method according to claim 9, wherein the supervised learning model is based on any one of (i) a logistic regression, (ii) support vector machines (SVM, or (iii) artificial neural networks (AAN).

11. The method according to claim 1, wherein the step of applying the model to the one or more unlabeled media objects further comprises steps of:

estimating a predicted attribute of the one or more unlabeled media objects; and refining the predicted attribute using a probabilistic graphical model.

12. The method according to claim 11, wherein the probabilistic graphical model is a Bayesian network.

13. The method according to claim 1, wherein the steps are performed in a platform constructed to automatically label media content based on user activity.

14. A system for predicting a content attribute, comprising:

an input interface configured to receive from an audio media object database one or more labeled media objects including audio content, wherein the one or more labeled media objects are labeled with one or more training attributes, the training attributes including at least one of danceability, energy, speechiness, liveness, acousticness, valence, and instrumentalness;

a ground-truth database configured to store the one or more training attributes;

a local feature extraction engine configured to extract one or more local features associated with the audio content;

a mid-level feature extraction engine configured to retrieve from the one or more labeled media objects one or more mid-level features associated with the audio content;

a selector engine configured to construct a feature vector of one or more content-derived values for each of the one or more labeled media objects based on (i) the one or more local features, (ii) the one or more mid-level features, or (iii) a combination of (i) and (ii);

a machine learning processor configured to generate a model based on the feature vector and the one or more attributes;

the input interface further configured to receive one or more unlabeled media objects including audio content; and an acoustic attribution prediction subsystem configured to apply the model to one or more unlabeled media objects to generate one or more predicted acoustic attribute labels, the predicted acoustic attribute labels including at least one of danceability, energy, speechiness, liveness, acousticness, valence, and instrumentalness; and a processor device configured to, based on the one or more predicted acoustic attribute labels, generate and output to a peripheral device at least one of (i) a playlist, (ii) a recommendation, (iii) a catalog search result, and (iv) one or more catalogs categorized into one of a plurality of subclasses.

15. The system according to claim 14, wherein the one or more labeled media objects are labeled based on a user input.

16. The system according to claim 14, wherein the one or more labeled media objects are labeled based on a title of the one or more labeled media objects.

17. The system according to claim 14, wherein the one or more labeled media objects are labeled based on a text description of the one or more labeled media objects.

18. The system according to claim 14, wherein the one or more training attributes are a classification of the one or more labeled media objects into one or more classes.

19. The system according to claim 14, wherein at least one of the one or more training attributes is a ranking of the one or more labeled media objects.

20. The system according to claim 14, the mid-level feature extraction engine further configured to:

normalize and scale at least one of the mid-level features according to a distribution of the at least one of the mid-level features according to a distribution of the one or more mid-level features in the one or more labeled media objects.

21. The system according to claim 14, wherein the audio waveform analyzer is further configured to:

sample a segment of the one or more labeled media objects;

identify one or more local content features in the segment;

cluster the one or more local content features into one or more clusters;

normalize and scale the one or more clusters according to a distribution in the one or more labeled media objects; and and concatenate the one or more clusters into the feature vector.

22. The system according to claim 14, wherein the model is calculated using a supervised learning model.

23. The system according to claim 22, wherein the supervised learning model is based on any one of (i) a logistic regression, (ii) support vector machines (SVM or (iii) artificial neural networks (AAN).

24. The system according to claim 14, wherein the acoustic attribution prediction subsystem is further configured to:

estimate a predicted attribute of the one or more unlabeled media objects; and refine the predicted attribute using a probabilistic graphical model.

25. The system according to claim 24, wherein the probabilistic graphical model is a Bayesian network.

26. The system according to claim 14, wherein the media content is automatically labeled based on user activity.

27. A non-transitory computer-readable storage medium storing a program for causing a computer to implement the methods according to claim 1.

28. The method according to claim 1, wherein the one or more attributes are at least one of (i) on a continuous scale and (ii) a binary classification type.

29. The system according to claim 14, wherein the one or more attributes are at least one of (i) on a continuous scale and (ii) a binary classification type.

* * * * *